United States Patent Office 3,140,131
Patented July 7, 1964

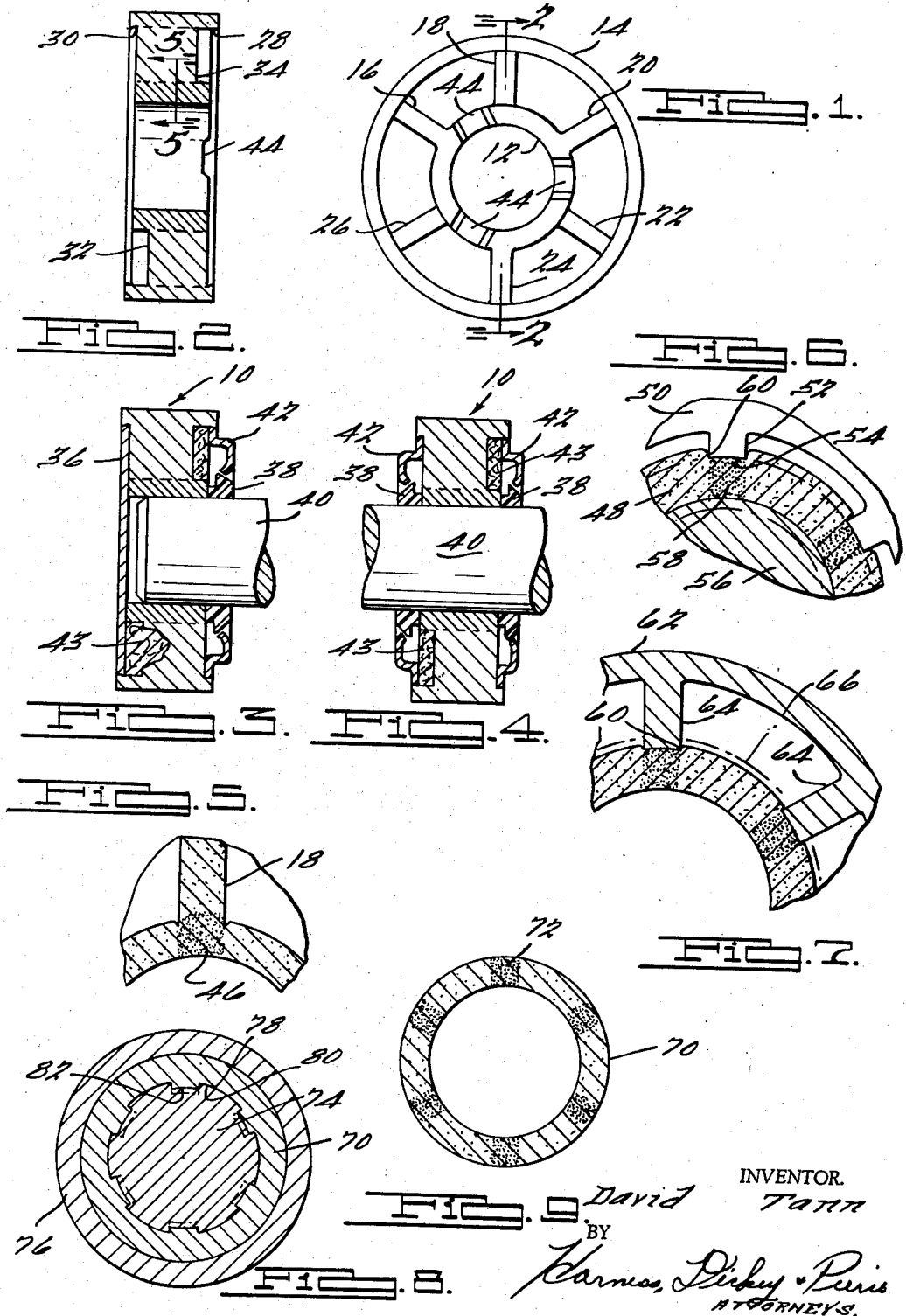

3,140,131
SELF-LUBRICATING BEARING
David Tann, 333 Covington Drive, Detroit 3, Mich.
Filed Nov. 28, 1958, Ser. No. 777,062
4 Claims. (Cl. 308—240)

This invention relates to self-lubricating bearings and particularly to a sintered powder metal bearing having portions thereof of greater density to provide increased resistance against wear.

It is one object of the invention to provide a sintered powder metal bearing having spaced portions on the working face thereof of greater density than the remainder of the bearing to provide increased resistance against wear, the remainder of the bearing being capable of more freely transmitting lubricating fluid through to the working face by capillary attraction.

It is another object of the invention to provide a sintered bearing having two concentric radially spaced rings interconnected by spider arms, with the portions of the inner ring adjacent the spider arms being of greater density to provide increased resistance against wear.

It is a further object of the invention to provide a method for compacting portions of a sintered bearing to provide greater resistance against wear.

It is a still further object of the invention to provide a method for compacting portions of a sintered bearing, such as a bushing, comprising broaching grooves on the working face of said bearing and compacting the lands between said grooves until they are flush with the bottoms of said grooves.

It is a still further object of the invention to provide a method for compacting portions of a sintered bearing in a simple, economical and rapid manner to provide increased resistance against wear.

Other objects, features and advantages of the present invention will become apparent from the following detailed description taken in conjunction with the accompanying drawings, in which:

FIGURE 1 is a front view of a spider-type sintered bearing embodying features of the invention;

FIG. 2 is a sectional view of the bearing illustrated in FIG. 1 taken along the line 2—2 thereof;

FIG. 3 is a sectional view similar to that of FIG. 2 illustrating the bearing rotatably supporting the end of a shaft;

FIG. 4 is a sectional view similar to that of FIG. 2 illustrating the bearing supporting a shaft intermediate the ends thereof;

FIG. 5 is an enlarged sectional view of the bearing illustrated in FIG. 2 taken along the line 5—5 thereof;

FIG. 6 is a fragmentary sectional view of a bearing having portions thereof compacted by a method embodying features of the invention;

FIG. 7 is a fragmentary sectional view of the bearing illustrated in FIG. 6 after it has been compacted and as mounted in a spider retaining member;

FIG. 8 is a sectional view of a sintered bushing having portions thereof compacted in accordance with another method embodying features of the invention; and FIG. 9 is a sectional view of the sintered bushing formed by the method illustrated in FIG. 8.

Referring to FIGS. 1 and 2, a sintered bearing 10 embodying features of the invention is illustrated which comprises an inner ring 12 and an outer ring 14 interconnected by a plurality of spider arms 16–26. The sintered bearing 10 is made by the well-known process of compressing a suitable powder metal or mixture of powder metals, such as copper and tin, for example, to the desired shape in dies or presses and thereafter sintering the bearing into a strong pure bronze that is porous enough to transmit lubricating material therethrough by capillary attraction.

Each end of the bearing is recessed as at 28 and 30 for a purpose which will be described hereinafter, and alternate ones of the arms are spaced axially inwardly from one or the other of the ends of the rings 12 and 14. For example, each of the arms 16, 20 and 22 is spaced inwardly as at 32 from the left end of the rings, as most clearly illustrated in FIG. 2, and each of the arms 18, 22 and 26 is spaced inwardly as at 34 from the right end of the rings.

This enables a suitable wicking material impregnated with a lubricant to be disposed in the spaces between the rings and arms in a manner to permit communication between the wicking material in adjacent spaces. For example, wicking material disposed between the arms 16 and 18 could communicate with wicking material between the arms 18 and 20 even when the ends of the bearing are enclosed, as illustrated in FIGS. 3 and 4, by virtue of the axial space 34 adjacent the arm 18, and wicking material between the arms 16 and 18 could also communicate with wicking material between the arms 16 and 26 by means of the axial space 32 adjacent the arm 16.

The spider bearing 10 can be used in any number of ways, such as for supporting the end of a shaft, as illustrated in FIG. 3, or for supporting a shaft intermediate the ends thereof, as illustrated in FIG. 4. When supporting the end of a shaft, a cover 36 is secured within the recess 30 to close off the left end of the bearing, and an oil slinger 38 is secured directly to shaft 40 in a manner to cooperate with an annular expansion plug 42 secured within the recess 28 to prevent lubricating fluid from escaping from the bearing 10 as will be described.

When the spaces between each of the arms 16–26 are filled with a wicking material 43 which retains a suitable lubricant, the lubricant will pass through the porous inner ring 12 to the surface of the rotating shaft 40 in a conventional manner to lubricate it. Of course, as is well known, the rotating shaft will move the lubricant thereon in one direction or the other depending on the direction of rotation of the shaft. If the lubricant moves to the left, as illustrated in FIG. 3, it is retained within the bearing by the cover 36, and if it moves to the right, it is stopped by the oil slinger 38 which is tightly secured to the shaft 40 and rotates therewith. A plurality of circumferentially spaced radially extending grooves 44 are formed in the right end of the inner ring 12 and communicate with the space between selected pairs of arms so that when the lubricant is stopped by the oil slinger 38, it will find its way to the grooves 44 and will be thrown radially outwardly through the grooves by the oil slinger. The annular expansion plug 42 catches the lubricant and is shaped in cross section to catch the lubricant and prevent it from escaping in a conventional manner.

In order to increase the resistance against wear of the bearing of the present invention and increase the life of the bearing, circumferentially spaced portions 46 (FIG. 5) of the inner ring 12 adjacent each of the arms 16–26 are increased in density relative to the remaining portions of the inner ring 12. With this construction the lubricant retained by the wicking material will pass through the portions of the inner ring between the dense portions 46 as before, and the dense portions will increase the life of the bearing 10 by providing increased resistance against wear.

The portions 46 may be formed by compacting in several different ways. For example, the outer ring 14 can be suitably retained against radial expansion by a housing disposed thereabout and a slightly tapered mandrel inserted through the inner ring 12 to expand it radially a predetermined distance. This compacts the portions 46 as illustrated since they are backed up by the arms 16–26 of the bearing. The remaining portions of the inner ring are more or less free to expand outwardly without compacting.

Another method for forming a sintered spider bearing with compacted portions along the working face thereof is illustrated in FIGS. 6 and 7 wherein a ring 48 is compacted by a member 50 having a plurality of longitudinally extending radially inwardly projecting lands 52 having their radially innermost surface 54 tapered longitudinally. A suitable mandrel 56 is disposed within the ring 48 to prevent it from collapsing and the member 50 is passed axially over the ring 48 so that the tapered faces 54 of the lands 52 compact portions 58 of the ring. This, in effect, forms grooves 60 in the outer surface of the ring 48 adjacent each of the compacted portions 58, and a spider member 62 having a plurality of radial arms 64 can be positioned over the ring 48 with each of the arms 64 disposed within the grooves 60 to support the ring 48 and in a manner somewhat similar to the bearing of FIG. 1. If desired, some of the excess material between the grooves 60 can be removed, as indicated by the dotted and dashed line 66, to enable lubricant to more easily pass through the ring 48.

Still further, in accordance with the present invention, a sintered bearing in the form of a bushing 70, as illustrated in FIG. 9 can be rapidly and economically formed with circumferentially spaced compacted portions 72 of greater density by a broaching tool 74 as illustrated in FIG. 8. In accordance with this method, a suitable backing member 76 is disposed about the bushing 70 to prevent it from expanding radially outwardly, and the broaching tool 74 is passed through the bushing so that cutting teeth 78 thereof broach a plurality of grooves 80 in the inside wall of the bushing.

The cutting tool 74 has a plurality of lands thereon behind the cutting teeth which completely fill the grooves 80 after they have been formed and also has longitudinally tapered lands adjacent each of the lands 82 formed between the grooves 80 which progressively compact the lands 82 as the cutting tool 74 continues to advance axially through the bushing. The aforementioned lands on the cutting tool that fill the grooves 80 of course make certain that the compacting of the lands 82 results in the dense compacted portions 72 by preventing the compacted material from flowing into the gorovos 80. With this method the portions of the ring adjacent the grooves 80 are not compacted and the portions 72 adjacent the lands 82 are compacted to increased resistance against wear.

While it will be apparent that the embodiments of the invention herein disclosed are well calculated to fulfill the objects of the invention, it will be appreciated that the invention is susceptible to modification, variation and change without departing from the proper scope or fair meaning of the subjoined claims.

What is claimed is:
1. A bearing comprising a body of porous sintered bearing material having two concentric radially spaced rings interconnected by radially extending arms, the portions of the inner ring adjacent said arms having a greater density than the remainder of the inner ring, and at least one end of the inner ring having a plurality of circumferentially spaced radially extending grooves therein, each groove being disposed between a different pair of said arms.

2. The subject matter as claimed in claim 1 wherein one end of alternate ones of said arms is spaced axially inwardly from the ends of said ring portions and the other end of the remaining arms is spaced axially inwardly from the other ends of said ring portions.

3. A bearing comprising two concentric radially spaced sleeves interconnected by at least three radially extending spider arms, the inner ring being made of a porous sintered bearing material with the portions thereof adjacent each of said arms having a greater density than the remainder of the inner ring to provide increased resistance against wear and greater load carrying capacity while the remainder of the inner ring can more freely transmit lubricating fluid therethrough.

4. A radial bearing for journaling a shaft adapted to extend axially therethrough comprising an elongated sleeve of porous sintered bearing material having a cylindrical bearing surface on the inner surface thereof, said sleeve having at least three circumferentially spaced, axially extending portions of greater density than the remainder of said sleeve and spaced substantially equidistant from one another whereby said portions improve the wear and load bearing characteristics of the bearing and the remaining portions of the sleeve can more freely transmit lubricating fluid to said bearing surface, and a plurality of axially extending arms projecting radially from said sleeve for supporting the sleeve on a supporting member in a manner to define a plurality of lubricant reservoirs between pairs of arms, each of said arms engaging said sleeve along different ones of said portions of greater density.

References Cited in the file of this patent
UNITED STATES PATENTS

| | | |
|---|---|---|
| 2,153,397 | Sandler | Apr. 4, 1939 |
| 2,227,307 | Hildabolt | Dec. 31, 1940 |
| 2,360,528 | Talmage | Oct. 17, 1944 |
| 2,365,562 | Koehring | Dec. 19, 1944 |
| 2,491,558 | Hansen | Dec. 20, 1949 |
| 2,615,766 | Wallace | Oct. 28, 1952 |
| 2,665,960 | Causley | Jan. 12, 1954 |
| 2,758,892 | Wallgren | Aug. 14, 1956 |
| 2,894,792 | Brilli | July 14, 1959 |